US011335360B2

(12) United States Patent
Lee et al.

(10) Patent No.: US 11,335,360 B2
(45) Date of Patent: May 17, 2022

(54) TECHNIQUES TO ENHANCE TRANSCRIPT OF SPEECH WITH INDICATIONS OF SPEAKER EMOTION

(71) Applicant: Lenovo (Singapore) Pte. Ltd., Singapore (SG)

(72) Inventors: Johnathan Co Lee, Cary, NC (US); Jonathan Jen-Wei Yu, Raleigh, NC (US)

(73) Assignee: Lenovo (Singapore) Pte. Ltd., Tokyo (JP)

( * ) Notice: Subject to any disclaimer, the term of this patent is extended or adjusted under 35 U.S.C. 154(b) by 0 days.

(21) Appl. No.: 16/578,307

(22) Filed: Sep. 21, 2019

(65) Prior Publication Data

US 2021/0090592 A1 Mar. 25, 2021

(51) Int. Cl.
| | |
|---|---|
| *G10L 25/63* | (2013.01) |
| *G10L 15/28* | (2013.01) |
| *G10L 15/26* | (2006.01) |
| *G10L 17/26* | (2013.01) |
| *G10L 25/72* | (2013.01) |
| *G10L 21/10* | (2013.01) |
| *G09B 19/04* | (2006.01) |
| *G06F 3/04847* | (2022.01) |
| *G06F 3/0482* | (2013.01) |

(52) U.S. Cl.
CPC ............ *G10L 25/63* (2013.01); *G06F 3/0482* (2013.01); *G06F 3/04847* (2013.01); *G10L 15/26* (2013.01); *G10L 15/28* (2013.01); *G10L 17/26* (2013.01); *G10L 21/10* (2013.01); *G10L 25/72* (2013.01); *G06F 2203/011* (2013.01); *G09B 19/04* (2013.01)

(58) Field of Classification Search
CPC ......... G10L 25/63; G10L 17/26; G10L 15/26; G10L 15/28; G06F 3/0482; G06F 3/04847
See application file for complete search history.

(56) References Cited

U.S. PATENT DOCUMENTS

| | | | |
|---|---|---|---|
| 6,442,593 B1 | 8/2002 | Wang et al. | |
| 6,785,649 B1 * | 8/2004 | Hoory | ..................... G10L 13/08 704/235 |
| 6,820,113 B2 | 11/2004 | Wang et al. | |

(Continued)

FOREIGN PATENT DOCUMENTS

| | | | | |
|---|---|---|---|---|
| CN | 202093460 U | 12/2011 | | |
| JP | 2015118185 A * | 6/2015 | ............. | G10L 25/48 |
| KR | 101856192 B1 * | 6/2018 | ............. | G10L 15/26 |

OTHER PUBLICATIONS

Emoji, n., Oxford English Dictionary (OED Online 2013) <https://www.oed.com/view/Entry/389343> (Year: 2013).*

(Continued)

*Primary Examiner* — Justin R. Blaufeld
(74) *Attorney, Agent, or Firm* — John M. Rogitz; John L. Rogitz (57) ABSTRACT

In one aspect, a device includes at least one processor and storage accessible to the at least one processor. The storage includes instructions executable by the at least one processor to analyze the decibel levels of audio of a user's speech. The instructions are executable to, based on the analysis, enhance a transcript of the user's speech with indications of particular words from the user's speech as being associated with one or more emotions of the user.

20 Claims, 6 Drawing Sheets

(56) References Cited

U.S. PATENT DOCUMENTS

| | | | |
|---|---|---|---|
| 7,280,964 | B2 | 10/2007 | Wilson et al. |
| 7,580,838 | B2 | 8/2009 | Divay et al. |
| 7,599,838 | B2 | 10/2009 | Gong et al. |
| 7,921,374 | B2 | 4/2011 | Griffin |
| 8,170,872 | B2 | 5/2012 | Lyle |
| 8,219,397 | B2 | 7/2012 | Jaiswal et al. |
| 8,447,285 | B1 | 5/2013 | Bladon et al. |
| 8,638,911 | B2 | 1/2014 | Balasaygun et al. |
| 8,812,171 | B2 | 8/2014 | Filev et al. |
| 8,949,128 | B2 | 2/2015 | Meyer et al. |
| 9,015,046 | B2 | 4/2015 | Pereg et al. |
| 9,432,501 | B2 | 8/2016 | Vishwanath |
| 10,293,260 | B1 * | 5/2019 | Evans ................. A63F 13/67 |
| 2003/0229497 | A1 | 12/2003 | Wilson et al. |
| 2004/0138881 | A1 | 7/2004 | Divay et al. |
| 2004/0140956 | A1 * | 7/2004 | Kushler ............. G06F 3/0236 |
| | | | 345/168 |
| 2006/0047520 | A1 | 3/2006 | Gong et al. |
| 2006/0074980 | A1 | 4/2006 | Sarkar |
| 2007/0078832 | A1 | 4/2007 | Ott et al. |
| 2008/0270123 | A1 * | 10/2008 | Levanon ............... G10L 17/26 |
| | | | 704/E11.002 |
| 2009/0055190 | A1 | 2/2009 | Filev et al. |
| 2009/0206979 | A1 | 8/2009 | Tepper et al. |
| 2009/0306979 | A1 | 12/2009 | Jaiswal et al. |
| 2010/0299137 | A1 * | 11/2010 | Abe .................... G10L 25/48 |
| | | | 704/E15.001 |
| 2011/0021178 | A1 | 1/2011 | Balasaygun et al. |
| 2011/0055674 | A1 * | 3/2011 | Sakai ................. G06F 40/169 |
| | | | 715/200 |
| 2011/0202876 | A1 * | 8/2011 | Badger ............... G06F 40/247 |
| | | | 706/12 |
| 2012/0246136 | A1 | 9/2012 | Moss |
| 2013/0019173 | A1 * | 1/2013 | Kotler ............... G06F 3/04883 |
| | | | 715/834 |
| 2013/0038756 | A1 | 2/2013 | Cheng |
| 2014/0095148 | A1 | 4/2014 | Berjikly et al. |
| 2014/0095149 | A1 | 4/2014 | Berjikly et al. |
| 2014/0095150 | A1 | 4/2014 | Berjikly et al. |
| 2014/0163980 | A1 | 6/2014 | Tesch et al. |
| 2015/0248424 | A1 * | 9/2015 | Berube ................. G06F 16/93 |
| | | | 715/234 |
| 2016/0217807 | A1 * | 7/2016 | Gainsboro ........ H04M 3/42221 |
| 2016/0322065 | A1 * | 11/2016 | Shimoji ................. G09B 5/06 |
| 2017/0364484 | A1 * | 12/2017 | Hayes ................. G06F 40/109 |
| 2018/0061407 | A1 * | 3/2018 | Qin .................... G06F 3/04817 |
| 2019/0026056 | A1 * | 1/2019 | Wang ................... G06F 1/1633 |
| 2019/0121851 | A1 * | 4/2019 | Shires .................... G10L 21/10 |
| 2019/0130910 | A1 * | 5/2019 | Kariya .................. G10L 25/63 |
| 2019/0221208 | A1 * | 7/2019 | Chen ..................... G06F 3/167 |
| 2019/0373336 | A1 * | 12/2019 | Kim ...................... G10L 25/63 |
| 2020/0090661 | A1 * | 3/2020 | Ackerman ............. G06F 17/18 |
| 2020/0111386 | A1 * | 4/2020 | Scholz .................... G09B 7/00 |
| 2020/0160866 | A1 * | 5/2020 | Szymanski .............. G06N 3/08 |
| 2020/0273450 | A1 * | 8/2020 | Qu ......................... G10L 15/02 |
| 2020/0302952 | A1 * | 9/2020 | Pinkus .................. G10L 25/90 |
| 2020/0312351 | A1 * | 10/2020 | Takahashi ............... G06F 3/167 |
| 2020/0342057 | A1 * | 10/2020 | Boekweg .............. G06F 40/284 |
| 2021/0065582 | A1 * | 3/2021 | Liao ........................ G06N 3/08 |

OTHER PUBLICATIONS

Alex Hern, Don't Know the difference between emoji and emoticons? Let me explain, The Guardian (Feb. 6, 2015) < https://www.theguardian.com/technology/2015/feb/06/difference-between-emoji-and-emoticons-explained> (Year: 2015).*

Beaumont et al., "Preserving Emotion of User Input", file history of related U.S. Appl. No. 14/067,410, filed Oct. 30, 2013, now U.S. Pat. No. 9,342,501 issued May 17, 2016.

Beaumont et al., "Preserving Emotion of User Input", file history of related U.S. Appl. No. 15/155,886, filed May 16, 2016.

Beaumont et al., "Preserving Emotion of User Input", related U.S. Appl. No. 15/155,886, Applicant's response to Board Decision filed Jun. 23, 2021.

Beaumont et al., "Preserving Emotion of User Input", related U.S. Appl. No. 15/155,886, Board Decision dated Apr. 23, 2021.

* cited by examiner

TECHNIQUES TO ENHANCE TRANSCRIPT OF SPEECH WITH INDICATIONS OF SPEAKER EMOTION

FIELD

The present application relates to technically inventive, non-routine solutions that are necessarily rooted in computer technology and that produce concrete technical improvements.

BACKGROUND

As recognized herein, electronic meeting notes can be generated by devices based on conversation detected between meeting participants. However, as also recognized herein, current devices are limited in their functionality in that they are unable to identify and adequately convey emotions of the participants with the meeting notes even though this would be helpful for a person reviewing the meeting notes. There are currently no adequate solutions to the foregoing computer-related, technological problem.

SUMMARY

Accordingly, in one aspect a device includes at least one processor and storage accessible to the at least one processor. The storage includes instructions executable by the at least one processor to analyze the decibel levels of audio of a user's speech. The instructions are also executable to, based on the analysis, enhance a transcript of the user's speech with indications of particular words from the user's speech as being associated with one or more emotions of the user. The particular words may not include all the words of the transcript of the user's speech.

In some examples, the first device may be established by at least one server. In other examples, the first device may be established by an end-user device.

In some examples, the device may include a microphone accessible to the at least one processor and the instructions may be executable by the at least one processor to receive input from the microphone indicating the user's speech and to analyze the decibel levels based on the input indicating the user's speech.

Also in some examples, the device may include a display accessible to the at least one processor and the instructions may be executable by the at least one processor to present at least a portion of the transcript on the display as part of a graphical user interface (GUI). The GUI may include the indications of particular words from the user's speech as being associated with one or more emotions of the user. In some implementations, one or more of the indications may be established by graphical representations of a certain color, where the graphical representations may form part of the text of the transcript and where the graphical representations may be presented in a first color different from a second color in which text not associated with one or more emotions of the user is presented on the GUI. Additionally or alternatively, one or more of the indications may be established by one or more underlines of text of the transcript.

Still further, in some implementations the instructions may be executable by the least one processor to use facial recognition data to determine whether certain portions of the user's speech are associated with a positive emotion and to indicate, on the GUI and based on the determination, particular words from the user's speech as being associated with one or more emotions of the user by differentiating text determined to be associated with a positive emotion from text associated with a negative emotion and from text not associated with one or more emotions of the user.

In another aspect, a method includes accessing, at a device, a transcript of a user's speech. The method also includes determining, at the device, volume levels of different parts of the user's speech. The method further includes differentiating, using the device, different aspects of a visual representation of the transcript based on one or more emotions of the user that are identified based on the determining of the volume level of different parts of the user's speech.

In some implementations, the visual representation may be transmitted to an end-user device from a server establishing the device and the method may include accessing the transcript at least in part by using voice recognition to generate the transcript based on audio of the user's speech. In other implementations, the device may be an end-user device and the transcript may be accessed via local storage on the device and/or via communication with a server.

In some examples, the method may include determining the volume levels of different parts of the user's speech by analyzing decibel levels of different parts of the user's speech. Also in some examples, the method may include presenting the visual representation on an electronic display, where different aspects of the visual representation may be differentiated by presenting text of the transcript that is associated with one or more emotions of the user differently from text of the transcript that is not associated with one or more emotions of the user.

Additionally, in some implementations the method may also include differentiating, using the device, different aspects of the visual representation of the transcript based on a determination that one or more words of the transcript were used more than once by the user.

In still another aspect, a computer readable storage medium (CRSM) that is not a transitory signal includes instructions executable by at least one processor to determine one or more emotions of a user that the user exhibits while speaking and to present, on an electronic display, a graphical user interface (GUI) showing at least a portion of a transcript of the speech. The portion is presented with one or more sections indicating the one or more emotions of the user.

In some implementations, the instructions may be executable to analyze decibel levels of the user's speech and to determine the one or more emotions of the user based on the analysis.

Additionally, in some examples at least the portion of the transcript may be presented with one or more sections indicating the one or more emotions of the user by presenting text of one or more sections indicating the one or more emotions of the user in a different text size that other portions of the transcript that are shown on the GUI.

The details of present principles, both as to their structure and operation, can best be understood in reference to the accompanying drawings, in which like reference numerals refer to like parts, and in which:

DETAILED DESCRIPTION

The present application discloses devices and methods for determining and presenting indications of emotions along with the transcript of one or more people that might be speaking during a meeting to highlight important words, phrases, sentences, and even topics. This may be done by analyzing the decibel levels used to speak the words via start and end times.

For example, a device may analyze a conversation between two people to identify decibel levels at which the people are speaking and then use that information to identify key words, phrases, or sentences that either go above or below an average decibel level (mean) across the time duration. For example, if User A speaks in a 60 minute meeting for 14 minutes, software on a device in the meeting room may identify User A's voice and create a database for it (and not for speech of any other participants to the conversation). The device may analyze the decibel level of the 14 minutes of User A's speech and provide an average (mean) score. Then the software may highlight words, phrases, or sentences in a transcript that were determined to go above or below that average score. The highlighting can be done using different colors for certain words, different sizes for certain words, and other graphical attributes for certain words. Other people that would subsequently read the notes/transcript may then be able to see the differences and inflection points and tone in User A's speech to give the other people additional context or attach an empathetic value to the notes.

Furthermore, in some examples a database may store all of this information and utilize machine learning in order to continuously improve the accuracy of the mean decibel level that is used as well as to correlate data points such as words, phrases, and sentences that are often repeated with visual emphasis to suggest "importance" across a defined range such as a specific project meeting that recurs weekly.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
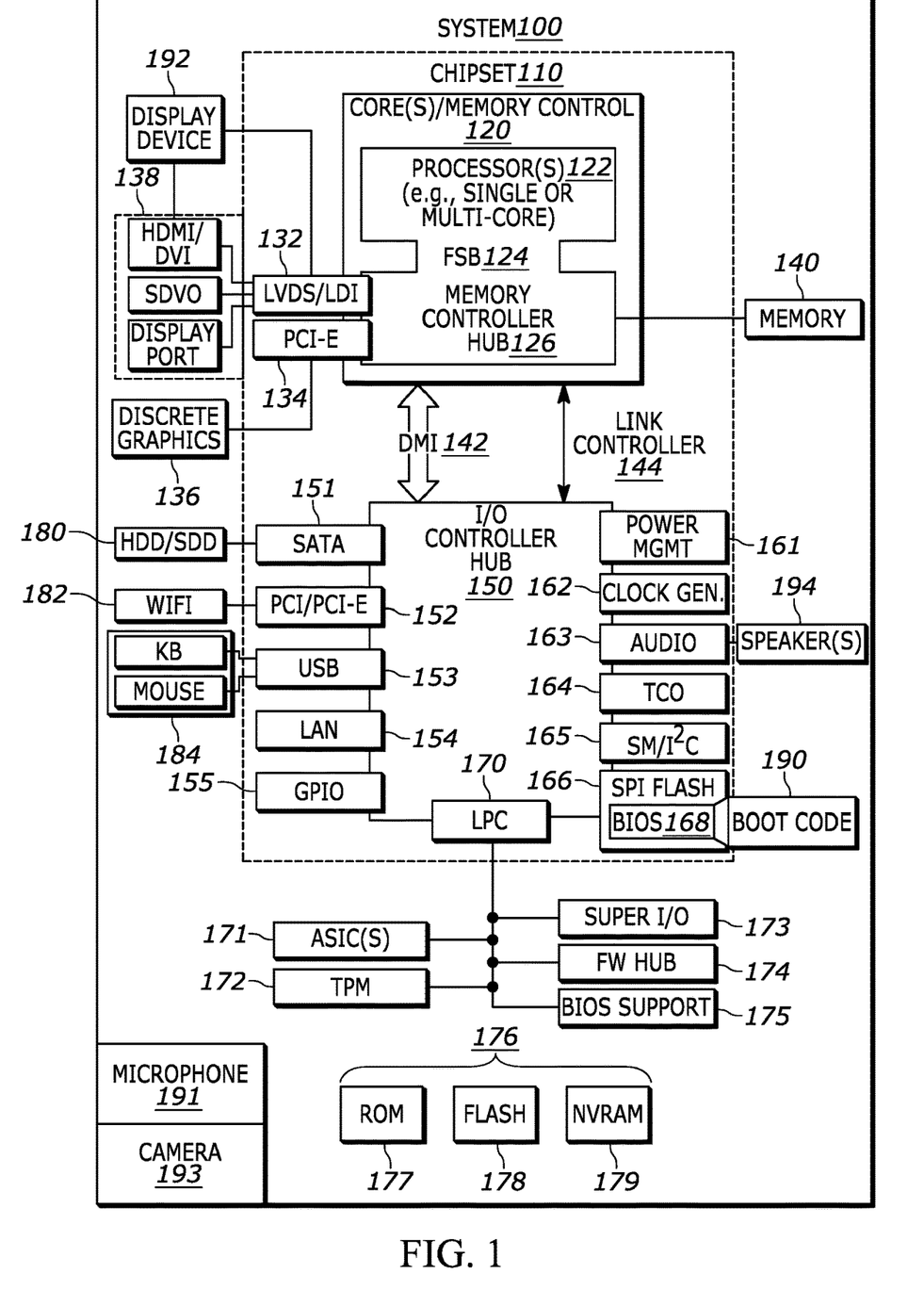
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that provides input from the microphone 191 to the processor 122 based on audio that is detected, such as a user speaking during a meeting consistent with present principles. The system 100 may also include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
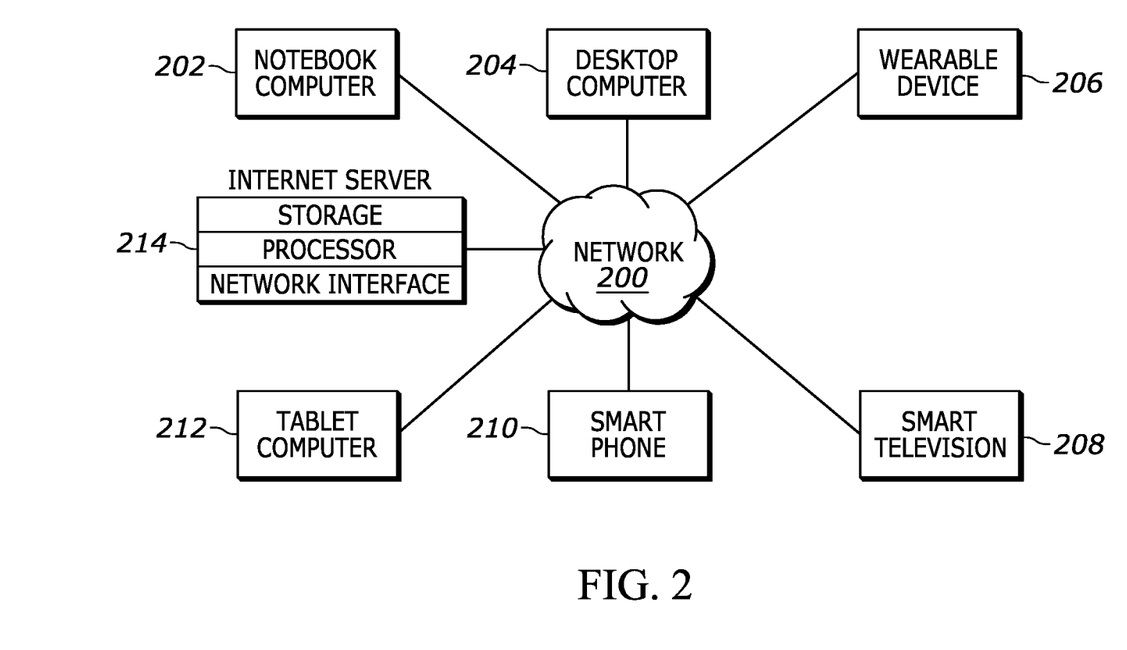
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
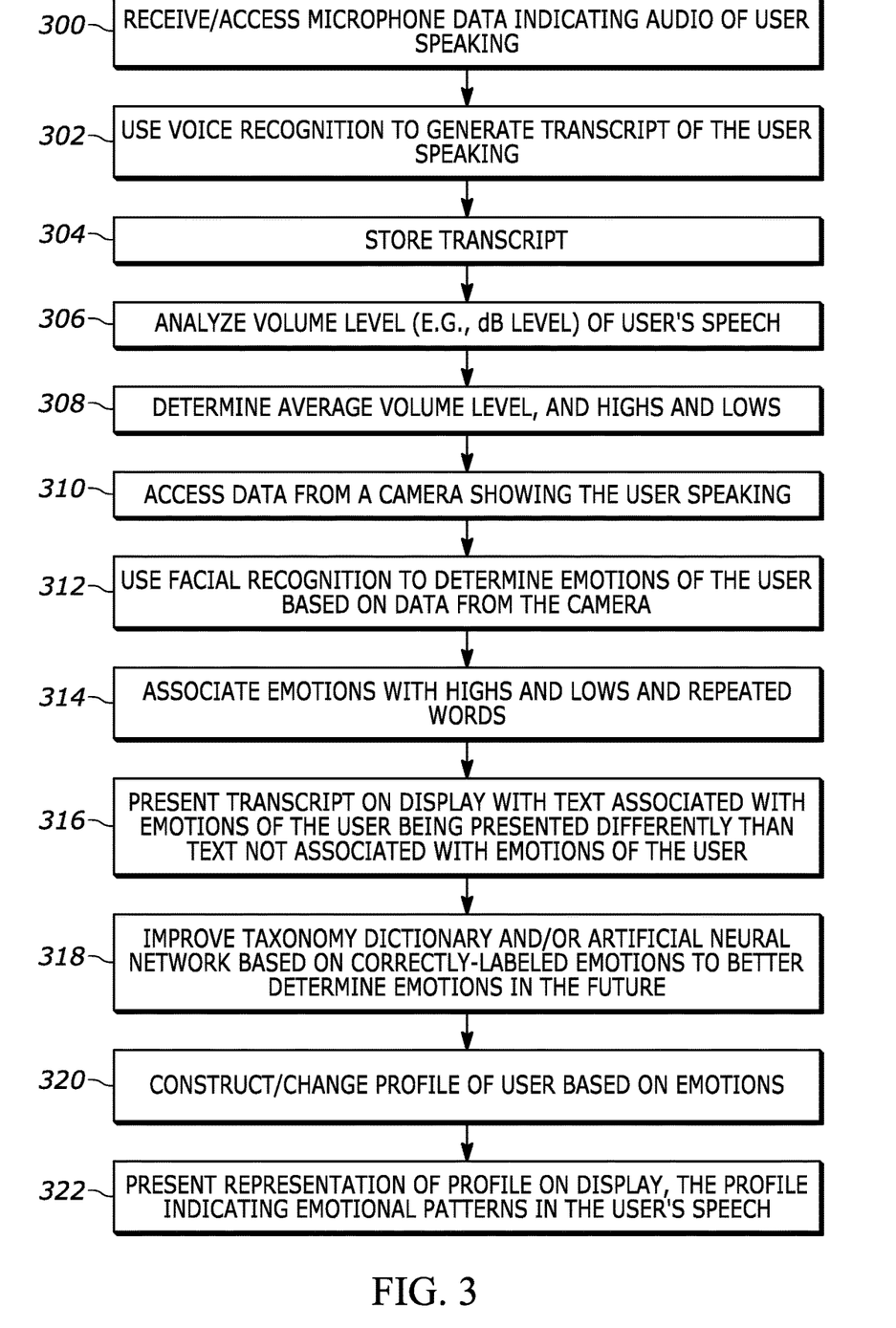
FIG. 3 is a flow chart of an example algorithm consistent with present principles.

Referring to FIG. 3, it shows example logic that may be executed by a device such as a server or end-user device consistent present principles. Beginning at block 300, the device may receive or otherwise access microphone data indicating audio of one or more users speaking. Only one user will be referenced below, but it is to be understood that present principles apply to instances where multiple users speak and hence a transcript may indicate the speech of multiple users. Alternatively, a particular user may be identified using voice identification or other biometric input and only that particular user's speech may be used to generate an enhanced transcript consistent with present principles.

In any case, the data of block 300 may be streamed from the microphone as the user speaks, or accessed at a storage location as stored based on past speech detected by a microphone. Also note that the speech itself may be speech provided by a person while engaged in a meeting with other participants, though the speech may be from other situations as well such as a person delivering a monologue or delivering a public speech in front of a crowd.

From block 300 the logic may proceed to block 302. At block 302 the device may use voice recognition software and/or speech to text software to generate a transcript of the user speaking as indicated via the data accessed at block 300. Also at block 302, the device may identify one or more words from the microphone data or transcript that are repeated by the user more than once. The logic may then proceed to block 304 where the device may store the transcript in local storage and/or at a remote location. From block 304 the logic may then move to block 306.

At block 306 the device may analyze the volume levels of the user's speech. In some examples the volume levels may be analyzed by analyzing decibel (dB) levels in particular, though other methods may also be used.

The volume levels of the user's speech may be determined by the device by passing the microphone data through an electronic equalizer capable of outputting volume measurements in decibels or other metrics, and/or by simply determining the amplitude of various sounds indicated in the microphone data. Other audio analysis software may be used as well, such as a decibel reader/meter application. The volume levels may then be analyzed at block 306 to determine, at block 308, an average volume level for the user's speech as well as high and low volume levels for the user's speech. High volume levels and low volume levels may not necessarily implicate one absolute high and one absolute low of all of the user's speech, respectively, but may also include other peaks and valleys deviating from the average volume level of the user's speech that may also be identified from the microphone data at block 308.

The average/mean volume level itself may be determined using outputs from the equalizer or other audio analysis software to average detected volume levels over time, and in some implementations the average volume level may not account for periods of time where the user is not detected as speaking or where the microphone data otherwise indicates no audio with measurable volume. Also in some implementations, the average volume level may encompass a range rather than a single number. For example, an average volume level may be established by a single number average volume, plus or minus twenty decibels (or, plus or minus another threshold set by an end-user or the device manufacturer).

From block 308 the logic may then proceed to block 310. At block 310 the device may access camera data showing the user speaking the speech indicated via the microphone data that was accessed at block 300, such as still images or video of the user. The camera data may be streamed from the camera as the user speaks, or accessed at a storage location as stored based on images collected in the past. The logic may then proceed to block 312 where the device may analyze the images/video using facial and gesture recognition software, emotion detection software, etc. The images/video may also be analyzed using an artificial intelligence model having at least one neural network (e.g., recurrent or deep neural network) configured for inferring emotion based on images of the user's face and/or the user's hand/arm/face gestures to determine one or more emotions of the user that occur at different times during the user's speech.

In some examples, the determined high and low volume levels may be used by the device as indicators of emotions to identify, and thus at block 312 the device may only analyze images/video for periods of time corresponding to the determined high and low volume levels (and/or may otherwise only determine/output emotions for those periods of time). This may be done by matching timestamps for the images with timestamps for the relevant speech data/audio itself. Thus, the foregoing may help the device consume less processing resources and thus improve the functionality of the device itself. Also note that repeated words as determined at block 302 may be similarly used as indicators of emotions to identify at block 312 using facial/gesture recognition.

Still further, in some embodiments at block 312 the device may determine emotions based on the audio data itself, e.g., using voice recognition. The device may also determine emotions from the audio data using an artificial intelligence model having at least one neural network (e.g., recurrent or deep neural network) configured for emotion inference based on speech audio and/or transcribed words for the device to identify emotions from keywords and/or word sequences of the user's speech. Other software for determining particular emotions based on speech and/or transcribed words may also be used, such as software that identifies correlations of keywords/phrases (or volume levels) with emotions via a taxonomy dictionary. Further, in some examples the indicators referenced in the paragraph above may also be used to determine emotions from audio/transcribed words for periods of time corresponding to the determined high and low volume levels, but not for other periods of time.

From block 312 the logic may proceed to block 314 where the device may associate emotions identified as occurring at certain times as the user speaks with various parts of the speech itself and/or with the corresponding parts of the transcript of the user's speech. For example, for each high or low volume of a portion of the user's speech, a corresponding emotion identified as occurring at the time the user provided that part of the speech may be associated with the portion of the transcript indicating that part of the speech. Additionally, at block 314 the device may associate emotions determined based on repeated words with the portions of the transcript indicating the repeated words themselves. Thereafter, the logic may proceed to block 316.

At block 316 the device may present a transcript of the user's speech on a display as part of a graphical user interface (GUI), such as the example GUI 400 of FIG. 4 that will be described later. The transcript may be presented with certain text from the transcript being enhanced with indications of corresponding emotion(s) of the user determined to have occurred at the time the user spoke the audio corresponding to that text, thus differentiating emotion-related text from other text of the transcript that might also be presented but for which no emotions were determined.

From block 316 the logic may then proceed to block 318. At block 318 the device may receive or access user input that indicates that one or more emotions that were associated with part of the user's speech (as indicated in the transcript) have been correctly or incorrectly labeled. This user input may then be used by the device at block 318 to improve or change a taxonomy dictionary that classifies certain keywords and/or key phrases as being associated with respective particular emotions so that the dictionary may be improved for future use by the device consistent with present principles. For example, should a user indicate that a given word in the transcript has been incorrectly labeled with a certain emotion, the device may remove the entry from the taxonomy dictionary associating that word with the labeled emotion.

The user input regarding correctly or incorrectly labeled emotions may also be used at block 318 to improve artificial intelligence models that might be used to determine emotions as described above. For example, machine learning in the form of supervised learning may be performed to optimize or re-train a neural network used for inferring emotions based on correctly and incorrectly determined emotions as indicated by the user (and hence labeled by the user for training). For example, optimization/training may occur using one or more classification algorithms and/or regression algorithms along with the user indications themselves.

Furthermore, in some examples the user may train the neural network in a separate process where the device may ask the user to say a certain phrase with a particular emotion (e.g., anger) so that the device may record the speech and camera stream and train the neural network with the recording labeled with the emotion "anger". Additionally or alternatively, the device may ask the user to review previously-recorded videos/speeches to label certain portions with corresponding emotions for similar training.

From block 318 the logic may next proceed to block 320. At block 320 the device may construct (or change) and store a speech profile for the user based on determined volume levels of the user's speech and any repeated words. The profile may also be constructed or changed based on determined emotions that were correctly labeled, emotions that were indicated by the user when another emotion was incorrectly identified, and/or emotions for which no user input was received in relation to their correctness. The profile may indicate emotional patterns recognized from the user's speech, patterns of the user speaking at different volume levels, and even words repeated by the user while speaking. These patterns may then be presented to the user via an electronic display at block 322 through a representation of the profile, either automatically when the transcript itself is presented and/or based on user command.

Figure 4:
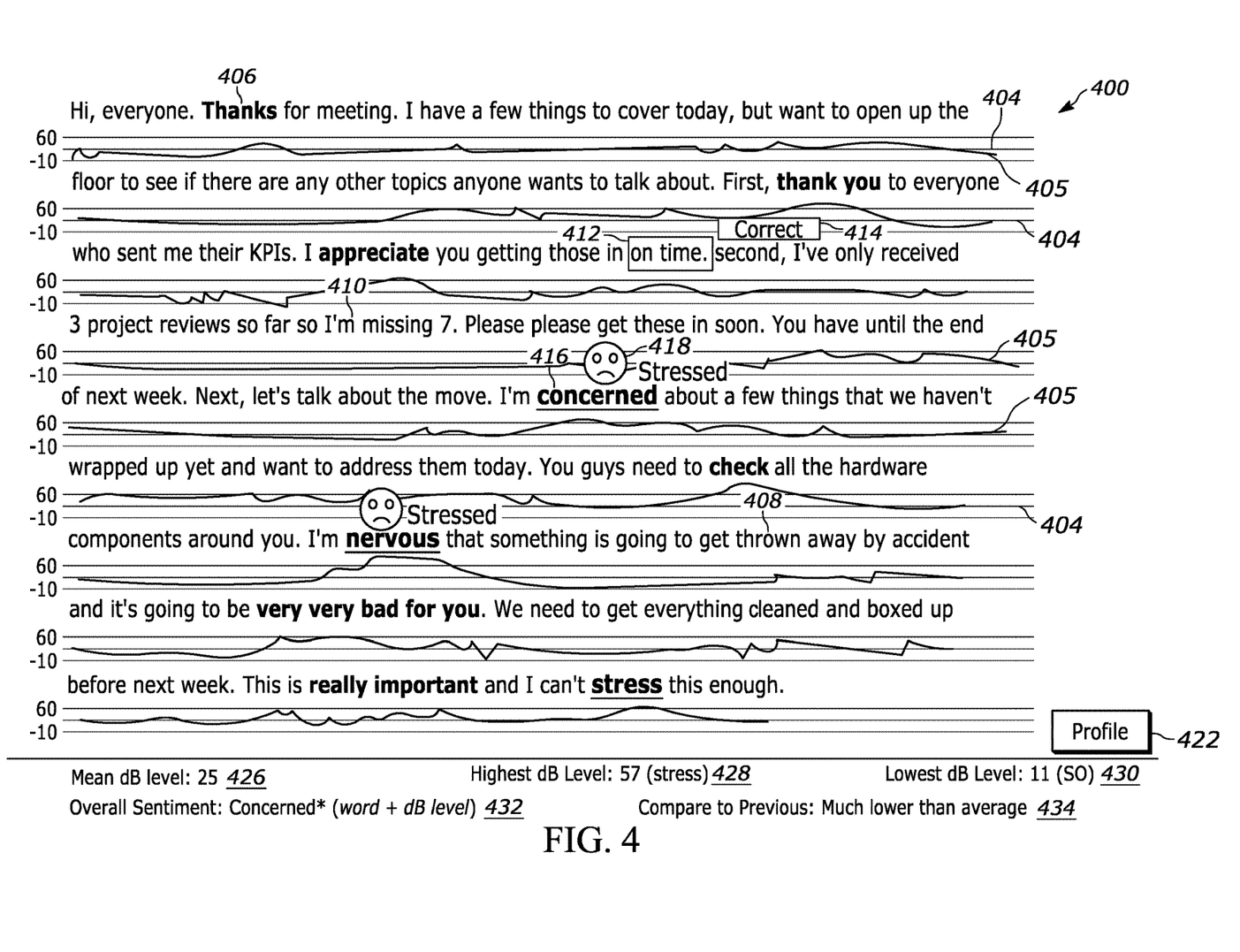
FIG. 4 shows an example graphical user interface (GUI) that includes an enhanced transcript of a person's audible speech consistent with present principles.

Now in reference to FIG. 4, it shows an example graphical user interface (GUI) 400 that may be presented on an electronic display. The GUI 400 may show at least a portion of a transcript 402 of a user's speech. As shown in FIG. 4, below each line of the transcript 402 may be a graphical representation 404 of a waveform demonstrating the volume levels of the user's speech over time when corresponding words represented immediately above respective parts of the representation 404 were spoken. The graphical representation 404 may be presented as part of a decibel range chart 405 below each line of the transcript 402, with each chart 405 indicating three lines. The three lines may establish, from bottom to top, a low volume boundary of minus ten decibels (e.g., relative to the determined average volume level of twenty five), the average volume level, and a high volume boundary of sixty decibels. Thus, in some examples the middle line of the charts 405 may establish a decibel level average midway between the high and low volume boundaries.

As may be appreciated from the GUI 400, in this example the word "thanks" on the top line of the transcript has been bolded and the graphical representation 404 beneath the word "thanks" indicates an increase in the volume of the user's voice when this word was spoken. Also note that although not shown in the black and white drawing of FIG. 4, the word "thanks" 406 may be presented in green color owing to it being associated with a positive emotion (e.g., gratitude and/or happiness) by a device undertaking present principles while words immediately before and after that have not been associated with an emotion ("Hi, everyone." and "for meeting.") may be presented in black text and not bolded. As another example, the phrase "thrown away" 408 may be presented in red color without bolding owing to it being associated with a slightly negative emotion (e.g., annoyed) while words immediately before and after that have not been associated with an emotion may be presented in black text.

Thus, it is to be understood that while text colors other than black may be used for all determined emotions in some examples, other emphasis such as bolding, underlining, and/or different font styles may also be used for words spoken by the user with extreme emphasis (e.g., with volume higher than a high volume level threshold that is itself above the average volume level). And in some examples, bolding, underlining, and/or different font styles (and even enlarged text) may be used for the same word indicated in the transcript 402 when it was spoken with extreme emphasis and associated with an emotion designated as extreme in data defined by a developer of the device or application undertaking present principles.

So, for example, bolding may be used for a word when spoken with extreme volume emphasis, while bolding, underlining, and text larger than surrounding portions may be used when a word was spoken with extreme volume emphasis and associated with an extreme emotion. As another example, only a different color designation may be used for a word when spoken with extreme volume emphasis while text larger than surrounding portions and a font different from surrounding portions (e.g., Times New Roman for emphasis, Arial for surrounding portions) may be used when a word was spoken with extreme volume emphasis and associated with an extreme emotion.

Also note that emojis and emotion labels may also be provided in some examples for words spoken with extreme emphasis and associated with an extreme emotion. So, for example, as shown in the fifth line of the transcript 402, the word "concerned" 416 may not just be bolded and underlined but also an emoji 418 for stress may be indicated adjacent to it along with the label "stressed" 420.

Still in reference to FIG. 4, also note that yellow colored text may be used for words associated with a determined emotion that may not be positive or negative, such as the emotions of inquisitive or confused. The word "missing" 410 in the fourth line of the transcript 402 is one example of this, though it may not be readily appreciated from the black and white drawings themselves.

Further still, in some examples one or more words of the transcript 402 may be selectable by a user using touch input or mouse input. Responsive to selection of one or more words, a box 412 or other graphical element to highlight the selected text may be presented along with a selector 414. The selector 414 may be selectable by the user for the user to correct a determined emotion that has been associated with the selected text. For example, the selector 414 may be selected to present a pop-up GUI over top of the GUI 400 from which other emotions may be selected to instead associate with the selected text. Additionally or alternatively, the selector 414 may be selected to command the device to remove the GUI 400 and present another GUI like the example GUI 500 of FIG. 5 which will be described later.

Still in reference to FIG. 4, in some examples the GUI 400 may also include a profile selector 422 that may be selectable to command the device presenting the GUI 400 to present a representation of a profile on its display, such as the profile mentioned above in referenced to blocks 320 and 322. One example representation of a profile will also be discussed later in reference to FIG. 6.

In some examples, the GUI 400 may further include a report 424 indicating various statistics related to the user's speech as reflected on the GUI 400. For example, an indication 426 of the user's mean decibel level for his/her speech may be presented. An absolute high volume level indication 428 may also be presented and indicate in parentheses the particular word spoken at the absolute high level ("stress") in addition to indicating the absolute high volume level itself. An absolute low volume level indication 430 may also be presented and indicate both the absolute low volume level and the word spoken at that level ("so").

Still further, the report 424 may include an indication 432 of an overall sentiment determined from all of the user's speech as indicated in the transcript 402. The overall sentiment may be determined by an artificial intelligence model inferring emotion consistent with present principles. The indication 432 may explicitly indicate the determined sentiment, which is "concerned" in this case, and how the sentiment was determined. In this case, the sentiment is indicated in parentheses as being determined based on spoken words and decibel levels.

The report 424 may further include an indication 434 of how the user's average volume level for the speech indicated in the transcript 402 compares to other speech that might have been provided by the user at different times in different settings or meetings. In this case, the indication 434 indicates that the user's average volume level was much lower than the average from previous speaking instances.

Figure 5:
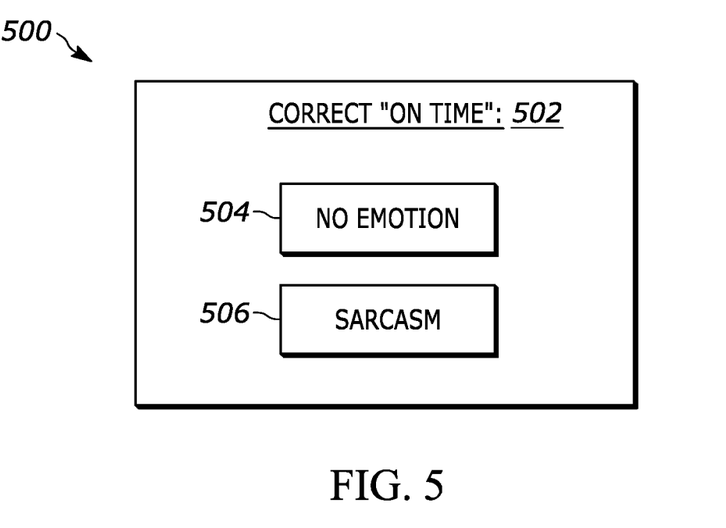
FIG. 5 shows an example GUI that may be used to correct an emotion identified by a device as associated with part of a user's speech consistent with present principles.

FIG. 5 shows an example GUI 500 that may be presented on an electronic display for a user to correct a determined emotion that has been associated with text presented as part of a transcript consistent with present principles. For example, the GUI 500 may be presented based on the user selecting certain words from a transcript as described above in reference to FIG. 4.

As shown in FIG. 5, the GUI 500 may include an indication 502 of the words from the transcript for which an emotion is being corrected. One or more selectors may also be presented on the GUI 500 for selecting a different emotion to associate with the selected words, such as the selector 506 for selecting the emotion of sarcasm to replace the emotion determined by the device itself. Also note that a selector 504 may be presented where the users does not wish that any emotion be associated with the selected words even if the device had determined one to be associated with the selected words.

Figure 6:
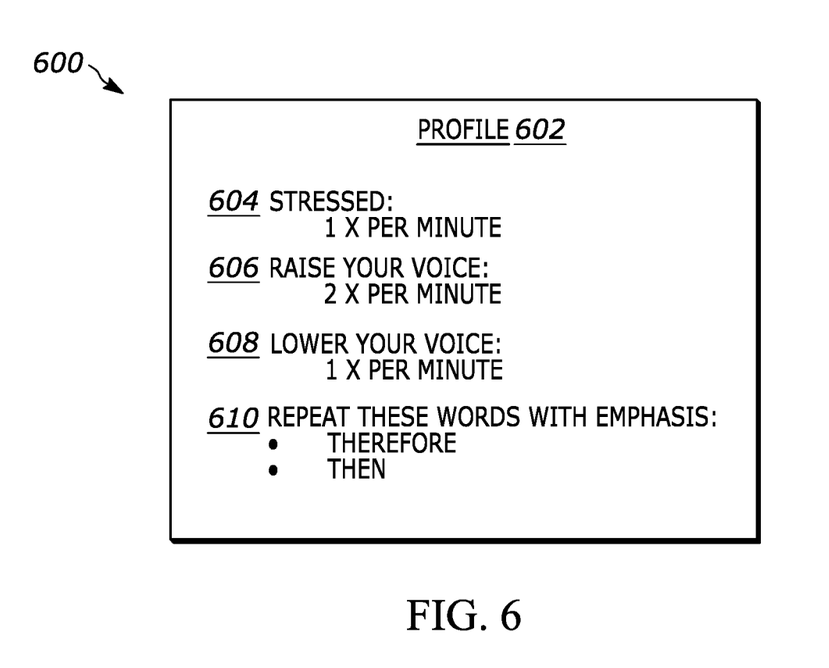
FIG. 6 shows an example GUI indicating data related to a user's speech profile consistent with present principles.

FIG. 6 also shows an example GUI 600 that may be presented on an electronic display. The GUI 600 may include a representation 602 of a speech profile of the user consistent with present principles. The representation 602 may be viewed by the user to, for example, learn how to improve his or her speaking ability and to moderate any undesirable characteristics that might be determined by the device.

As one example, the representation 602 may include an indication 604 of one or more emotions that the user frequently experiences while speaking, and may even indicate the frequency itself. In this case, the indication 604 indicates that the user experiences the emotion of stress one time per minute on average while speaking.

The representation 602 may also include an indication 606 of the frequency with which the user raises his or her voice above an average volume level consistent with present principles. In this example, the indication 606 indicates that the user raises his or her voice above average volume level two times per minute.

The representation 602 may further include an indication 608 of the frequency with which the user lowers his or her voice lower than the average volume level consistent with present principles. In this example, the indication 608 indicates that the user lowers his or her voice below average volume level one time per minute.

Even further, in some examples the representation 602 may include an indication 610 of words that are repeated by the user when speaking. In the present example, the user typically repeats the words "therefore" and "then".

Figure 7:
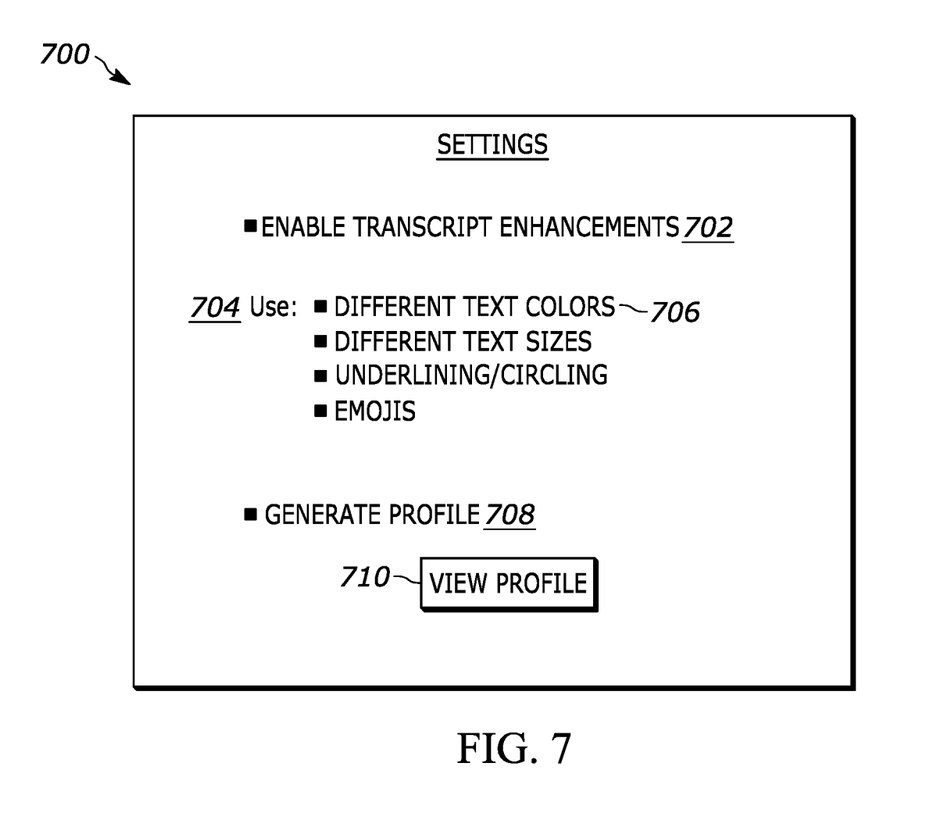
FIG. 7 shows an example GUI for configuring one or more settings of a device consistent with present principles.

Now describing FIG. 7, it shows an example GUI 700 that may be presented on an electronic display for configuring one or more settings of a device or application configured to undertake present principles. It is to be understood that each of the options to be discussed below may be selected by directing touch or mouse input to the respective check box shown adjacent to the respective option.

The GUI 700 may include a first option 702 that may be selectable to enable or set the device to undertake present principles to enhance a transcript. For example, the option 702 may be selected to configure an end-user's device to undertake the logic of FIG. 3 and present the GUI 400 of FIG. 4.

The GUI 700 may also include a section 704 providing various options 706 that a user may a select to designate associated ways that various portions of a transcript may be enhanced consistent with present principles. Thus, example options 706 may include using different text colors, using different text sizes, using underlining or circling, and using emojis.

Even further, in some examples the GUI 700 may include an option 708 that may be selectable to specifically configure the device to generate and maintain a speech profile consistent with present principles. Thus, selection of the option 708 may set the device to specifically perform the steps of blocks 320 and 322 described above. Also note that a selector 710 may be presented on the GUI 700 to provide a command for the user's profile to be presented on the display. For example, the GUI 600 may be presented on the display responsive to selection of the selector 710.

Moving on from FIG. 7, it is to be understood consistent with present principles that the distance between a user and a microphone may not always be constant in a given meeting or between meetings, which in turn may affect the average volume level detected by a microphone. To account for this and the use of various microphones that might have different capabilities, the average volume level (as well as high and low volume levels) may be normalized across different meetings and/or as a user changes distance with respect to a microphone used to detect the user's speech. The normalized average volume levels as well as normalized high and low volume levels may then be used by an artificial intelligence model for determining emotion consistent with present principles as well as for training the artificial intelligence model to accurately determine emotion consistent with present principles.

Normalization may occur in part by determining a running average volume level for a most-recent X number of seconds or minutes of the user speaking in a given instance. Also, separately determined average volume levels may themselves be averaged by the device, with the device assuming a user more or less speaks at the same average volume level regardless of distance and thus the device may normalize different average volume levels for different meetings based on this assumption (as well as normalizing the gaps to the high and low volume levels from the average volume levels). Normalization may also occur where distance may be known or determined based on input from a camera or rangefinder and where the device uses the inverse-square law since volume decreases at one over the distance squared ($1/d^2$).

Additionally, it is to be understood consistent with present principles that the pattern and speed at which a person speaks may indicate emotions and insights into the person's disposition that may also be used for differentiating text of a transcript consistent with present principles. Thus, a device undertaking present principles may analyze the user's speech pattern and, for example, infer that when the person speaks relatively fast (e.g., faster than a threshold number of words per minute) that the person is nervous, anxious, and/or fearful. Accordingly, the device may differentiate the text of a given transcript to reflect the fast-spoken words.

A person's heart rate and other biometrics may also be used for differentiating text. For example, input from a heart rate sensor on the person's smart watch that indicates the person's current heart rate may be used to correlate the heart rate to a particular emotion/speech pattern. E.g., when the person's heart rate is 140 beats per minute (bpm), which is 20 bpm higher than the person's normal/average bpm, a device undertaking present principles may infer that the person nervous and/or anxious. Accordingly, the device may differentiate the text of a given transcript to reflect words spoken while the person's heart rate was at 140 bpm. Such biometric input may be combined with, e.g., gesture recognition as set forth above to further improve such emotion inferences.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
    at least one processor;
    a display accessible to the at least one processor; and
    storage accessible to the at least one processor and comprising instructions executable by the at least one processor to:
    analyze decibel levels of audio of a user's speech;
    based on the analysis, enhance a transcript of the user's speech with indications of particular words from the user's speech as being associated with one or more emotions of the user, the particular words not comprising all the words of the transcript of the user's speech;
    present at least a portion of the transcript on the display as part of a first graphical user interface (GUI), the first GUI comprising the indications of particular words from the user's speech as being associated with one or more emotions of the user; and
    responsive to selection of an element from the first GUI, present a second GUI on the display, the element associated with a first indication of the indications, the second GUI comprising a selector that is selectable to change a portion of the transcript from association of a first emotion with the first indication to association of a second emotion with the first indication, the first emotion being different from the second emotion.

2. The device of claim 1, wherein the selector is a first selector, and wherein the GUI comprises a second selector that is selectable to change the portion of the transcript from association of the first emotion with the first indication to association of no emotion with the first indication, the second selector being different from the first selector.

3. The device of claim 1, wherein the second GUI comprises an indication of the portion of the transcript to which the association of the first emotion applies.

4. The device of claim 1, wherein the element comprises one or more words of the transcript.

5. The device of claim 1, wherein the selector is a first selector, and wherein the element comprises a second selector different from the first selector.

6. The device of claim 5, wherein the second selector is presented on the first GUI responsive to receipt of user input selecting one or more words of the transcript.

7. The device of claim 1, wherein the second GUI is a pop-up GUI presented over top of the first GUI.

8. The device of claim 1, wherein the instructions are executable to:
responsive to selection of the element from the first GUI, remove the first GUI from presentation on the display and present the second GUI on the display.

9. The device of claim 1, wherein the instructions are executable to:
execute machine learning based on selection of the selector to improve an artificial intelligence (AI) model used to perform the enhancement of the transcript.

10. The device of claim 9, wherein the machine learning comprises supervised learning.

11. The device of claim 9, wherein the instructions are executable to:
execute the machine learning to optimize and/or train at least one neural network forming part of the AI model.

12. The device of claim 11, wherein the at least one neural network is optimized and/or trained using a label determined from selection of the selector.

13. The device of claim 11, wherein the instructions are executable to:
optimize and/or train the neural network using one or more classification algorithms.

14. The device of claim 11, wherein the instructions are executable to:
optimize and/or train the neural network using one or more regression algorithms.

15. The device of claim 1, wherein the first GUI comprises a graphical representation of a waveform demonstrating the decibel levels of the audio of the user's speech over time, wherein different parts of the graphical representation as presented on the first GUI are associated with different words of the transcript.

16. A method, comprising:
accessing, at a device, a transcript of a user's speech;
determining, at the device, volume levels of different parts of the user's speech;
differentiating, using the device and via a first graphical user interface (GUI) presented on a display, different aspects of a visual representation of the transcript based on one or more emotions of the user that are identified based on the determining of the volume level of different parts of the user's speech; and
responsive to selection of an element from the first GUI, presenting a second GUI on the display, the element associated with a first aspect of the different aspects, the second GUI comprising a selector that is selectable to change a portion of the visual representation from association of a first emotion with the first aspect to association of a second emotion with the first aspect, the first emotion being different from the second emotion.

17. The method of claim 16, comprising:
executing machine learning based on selection of the selector to train an artificial intelligence (AI) model used to determine the one or more emotions for the visual representation of the transcript.

18. The method of claim 17, comprising:
executing the machine learning to train at least one neural network forming part of the AI model, the training executed using a label determined from selection of the selector.

19. A computer readable storage medium (CRSM) that is not a transitory signal, the computer readable storage medium comprising instructions executable by at least one processor to:
analyze decibel levels of the user's speech;
determine one or more emotions of a user based on the analysis;
present, on an electronic display, a first graphical user interface (GUI) showing at least a portion of a transcript of the speech, the portion being presented with one or more sections indicating the one or more emotions of the user; and
responsive to selection of an element from the first GUI, present a second GUI on the electronic display, the element associated with a first section of the one or more sections, the second GUI comprising a selector that is selectable to change a portion of the transcript from association of a first emotion with the first section to association of a second emotion with the first section, the first emotion being different from the second emotion.

20. The CRSM of claim 19, wherein the instructions are executable to:
execute machine learning based on selection of the selector to train at least one neural network forming part of an artificial intelligence (AI) model used to determine the one or more emotions, the neural network being trained using a label determined from selection of the selector.

* * * * *